Aug. 9, 1966 R. F. LENSE 3,265,251
MEASURING AND DISPENSING DEVICE
Filed Feb. 1, 1965 3 Sheets-Sheet 1
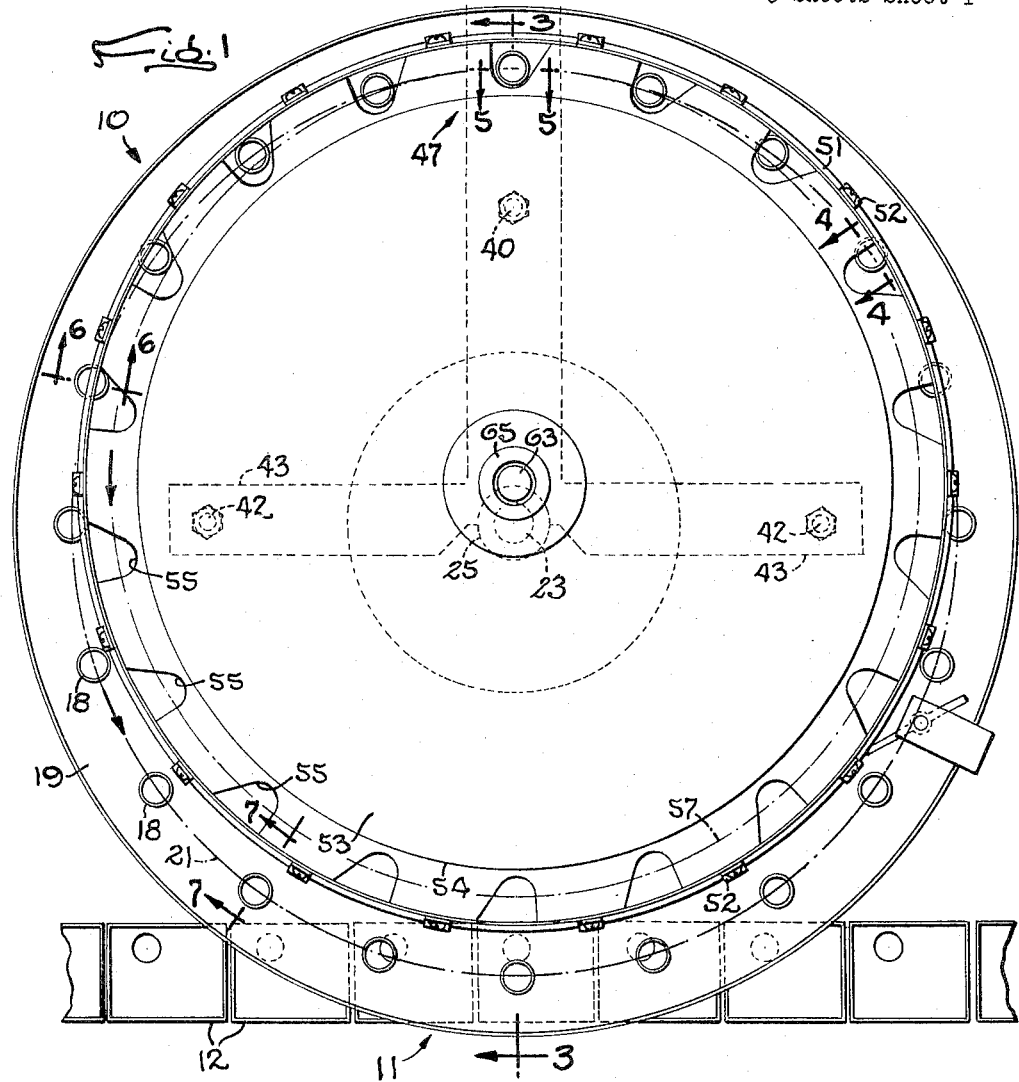
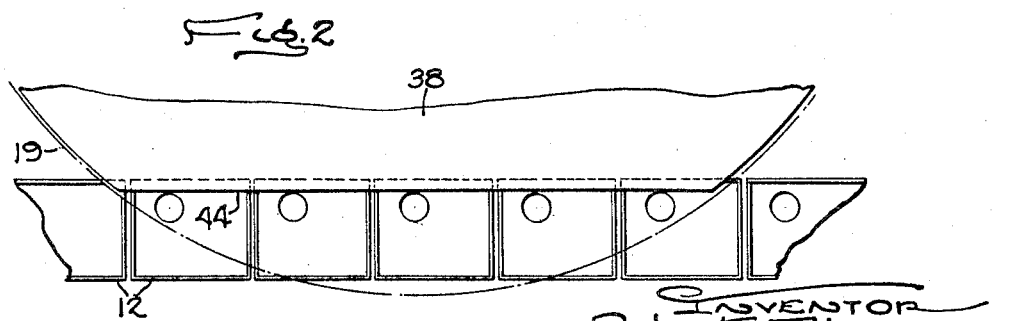
INVENTOR
Robert F. Lense
By Wolfe, Hubbard, Voit & Osann
ATTORNEY

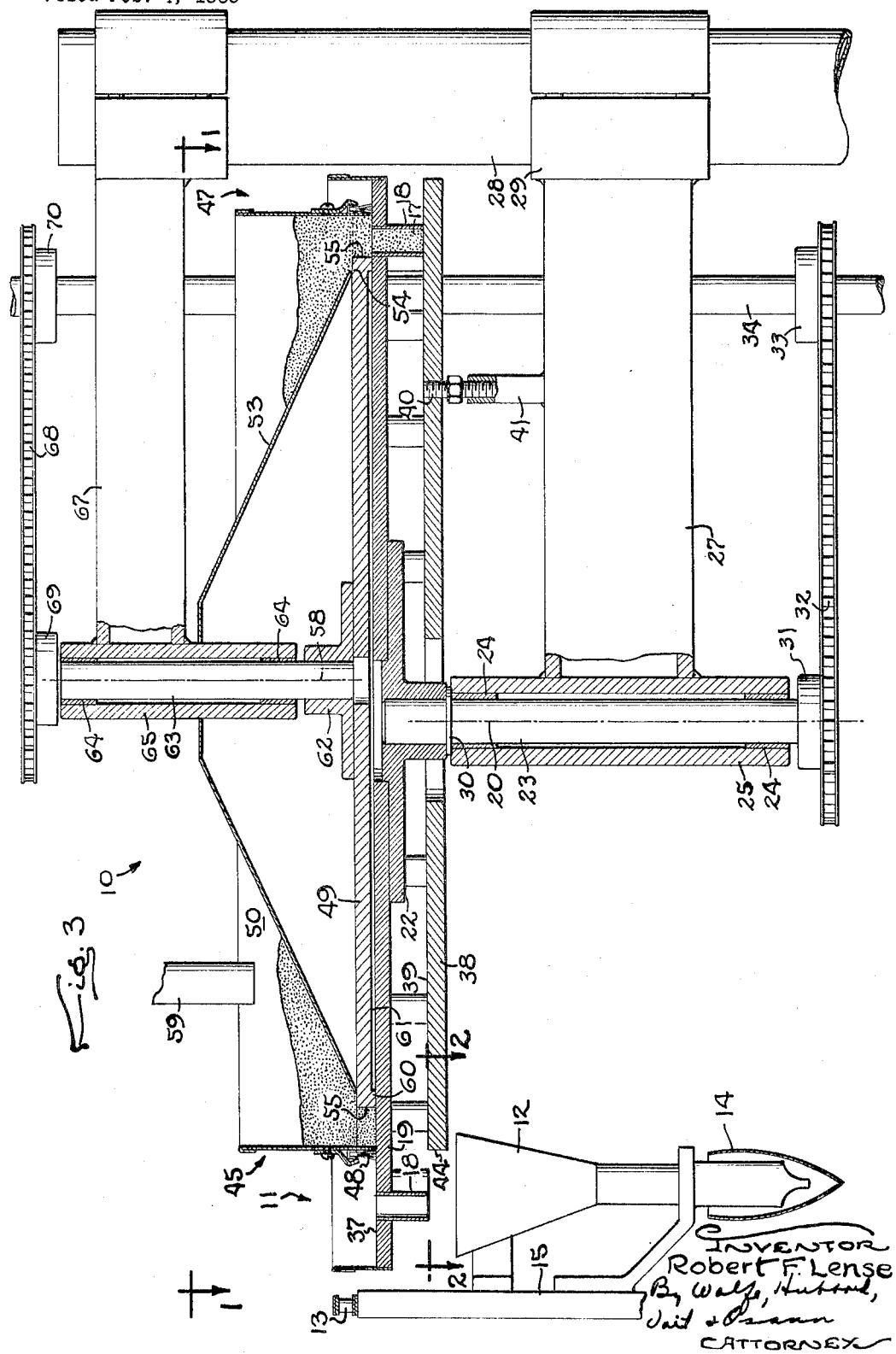

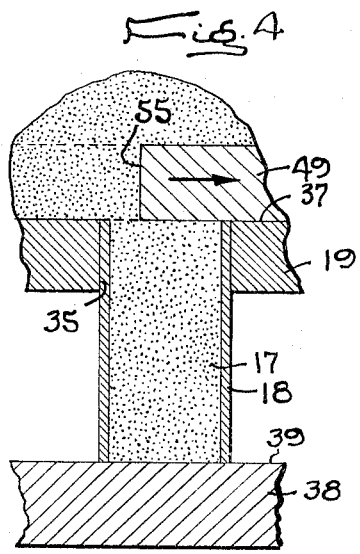
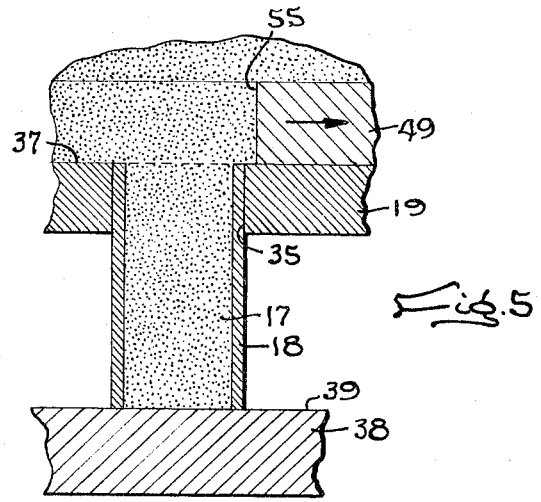
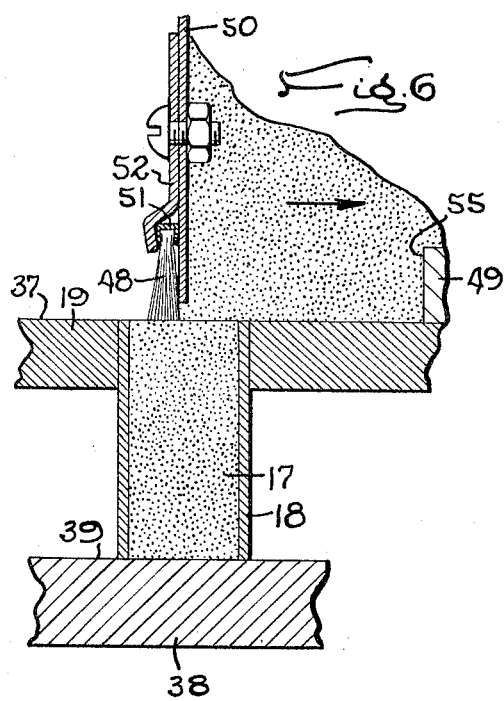
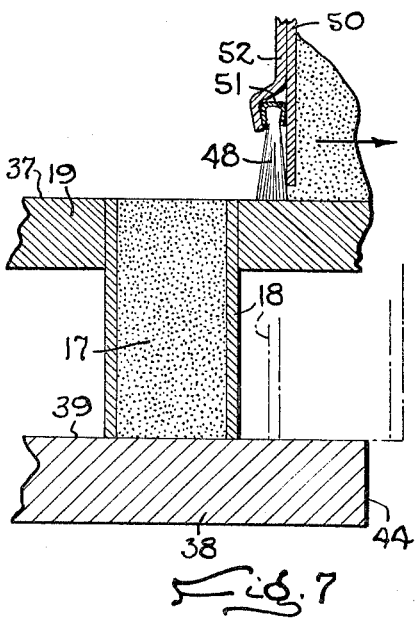

3,265,251
MEASURING AND DISPENSING DEVICE

Robert F. Lense, Rockford, Ill., assignor to Bartelt Engineering Company, Inc., Rockford, Ill., a corporation of Delaware
Filed Feb. 1, 1965, Ser. No. 429,321
5 Claims. (Cl. 222—168.5)

This invention relates to a device for measuring and dispensing quantities of fluent material and, more particularly, to a device in which solid particles are discharged into measuring receptacles of predetermined volume advanced along a circular path through angularly spaced filling and dispensing stations, the top surface of the material in each receptacle being brushed and leveled as the receptacles move toward the dispensing station so that each receptacle contains the same amount of material. The invention is particularly adapted for use in measuring and dispensing a product such as relatively small particles of candy-coated chewing gum preparatory to packaging of the product.

The primary object of the present invention is to measure and dispense such a product at high speed with a gentle, low speed brushing action for leveling the top surfaces of the material in the receptacles.

Another object is to minimize the wearing away of the surfaces of the particles by attrition during the measuring and dispensing of the product.

A more specific object is to fill and level the receptacles with a filler eccentrically mounted on top of the receptacle carrier and rotating in the same direction as the carrier to fill the receptacles along a portion of their path, and with a circular brush surrounding the filler to level the product in the receptacles in a novel manner as the receptacles pass from beneath the filler.

Other objects and advantages of the invention will become apparent from the following detailed description taken in connection with the accompanying drawings, in which FIGURE 1 is a fragmentary cross-sectional view taken in a horizontal plane above a measuring and dispensing device embodying the novel features of the present invention, the view being taken substantially along the line 1—1 of FIG. 3.

FIG. 2 is a fragmentary view taken substantially along the line 2—2 of FIG. 3.

FIG. 3 is a fragmentary cross-sectional view taken substantially along the line 3—3 of FIG. 1.

FIG. 4 is an enlarged fragmentary cross-sectional view taken along the line 4—4 of FIG. 1.

FIG. 5 is an enlarged fragmentary cross-sectional view taken along the line 5—5 of FIG. 1.

FIG. 6 is an enlarged fragmentary cross-sectional view taken along the line 6—6 of FIG. 1.

FIG. 7 is an enlarged fragmentary cross-sectional view taken along the line 7—7 of FIG. 1.

As shown in the drawings for purposes of illustration, the invention is embodied in a device 10 for measuring and dispensing quantities of fluent material into containers passing one by one through a dispensing station 11 on one side of the device. Herein, the device dispenses the measured quantities into a series of side-by-side funnels 12 carried on a chain 13 (FIG. 3) for movement through the dispensing station with a continuous motion above a series of open-ended bags 14 supported on a carrier (not shown) for movement beneath the funnels. Each funnel is supported in a well known manner on a guide 15 for movement into the alined bag as the latter approaches the dispensing station and thus guides the dispensed product into the bottom of the bag.

Measurement of the product into successive charges 17 of the desired volume is accomplished by filling a succession of measuring receptacles 18 of predetermined volume with the product while the lower ends of the receptacles are closed, and then brushing the open upper ends of the receptacles to level the product therein so that each receptacle contains the same amount of material. Then the receptacles are moved through the dispensing station 11 where the lower ends are opened to discharge the product into a funnel 12 moving through the station. For this purpose, the measuring device 10 includes a carrier 19, hereafter called a wheel, mounted for rotation about a vertical axis 20 with the receptacles equally spaced along a pitch circle 21 concentric with the wheel for movement of the receptacles around the pitch circle as the wheel rotates in one direction, counterclockwise as viewed in FIG. 1.

In this instance, the wheel 19 is a horizontal disk supported at its center on a hub 22 fast on the upper end of a shaft 23 journaled in vertically spaced bearings 24 in a sleeve 25 welded to the free end of a horizontal arm 27 projecting laterally from a post 28 which is part of the machine frame. A split sleeve 29 on the arm is clamped around the post and thus holds the arm at an adjustable level relative to the post. On the upper end portion of the shaft is an annular shoulder 30 which rests on top of the sleeve 25 and thus holds the hub and the disk at the selected level.

To drive the wheel 19, a sprocket wheel 31 (FIG. 3) is mounted on the lower end of the shaft 23 below the sleeve 25 and is rotated by an endless chain 32 trained around a similar sprocket wheel 33 on a vertical drive shaft 34. This shaft is rotated in timed relation with the advance of the bags 14 and the funnels 12, usually by the main cycle shaft (not shown) of the package machine.

The measuring receptacles 18 are formed by identical cylindrical tubes pressed into holes 35 through the wheel disk adjacent the periphery of the disk with the upper ends of the tubes level with the top surface 37 of the disk and the lower ends spaced below the disk in a common horizontal plane. Below the wheel is a plate 38 having an upper surface 39 for engaging the lower ends of the tubes 18 and closing the latter to hold the material in the tubes until the tubes are positioned over the funnels 12. As each tube passes through the dispensing station 11, it passes over an opening in the plate and thus releases its charge of material into one of the funnels.

Herein, the closure plate 38 is generally circular in shape and is supported in a horizontal plane beneath the wheel by means of a stud 40 threaded at its lower end into a lug 41 projecting upwardly from the arm 27 and similar studs 42 (FIG. 1) projecting upwardly from lugs (not shown) on the ends of bars 43 projecting radially from opposite sides of the sleeve 25 beneath the closure plate. The upper ends of the three studs are threaded into the closure plate so that the plate may be raised, lowered and leveled by selective adjustment of the studs.

Preferably, the closure plate 38 is coaxial with the wheel disk 19 and is of the same diameter to project beyond the path of the measuring tubes 18 and close the lower ends thereof. To form a dispensing opening in the plate for releasing the product at the dispensing station 11, one edge portion of the plate simply is cut off along a chord of the circle (see FIG. 2) to form a straight edge 44 overlying the tops of the funnels 12 passing through the dispensing station and paralleling the path of the funnels. Thus, as each tube slides along the closure plate and passes the straight edge thereof, the lower end of the tube is opened to discharge the product past the plate. The edge 44 is positioned, of course, to release the product only when the tubes are positioned to drop the product into a passing funnel, and the velocity of the receptacles is correlated with the velocity of the funnels to insure that each receptacle remains over the associated funnel long enough to direct the product into the funnel.

In accordance with the present invention, the receptacles 18 are filled and the product therein is leveled in a novel manner by a filler 45 eccentrically mounted on top of the wheel 19 for rotation in the direction of rotation of the wheel, and having an annular dispensing area smaller in diameter than the pitch circle 21 of the receptacles and overlying the pitch circle at a filling station 47 spaced from the dispensing station 11. A circular brush 48 extends completely around the hopper outside the dispensing area and projects downwardly into sweeping proximity with the top surface 37 of the wheel.

With this general arrangement, a portion of the annular dispensing area overlies the path of the tubes 18 at the filling station 47 to deposit a charge of material in each tube while the lower end of the tube is closed by the plate 38. As each filled tube continues around the wheel 19 beyond the filling station, the path of the tube departs gradually from the path of the dispensing area until the tube no longer communicates with the filler. During this departure, the brush 48 moves slowly and smoothly across the top of each tube to level the top of the material therein with a gentle sweeping action before the material is discharged.

In this instance, the filler is a rotary hopper comprising a disk 49 overlying the upper surface 37 of the wheel 19 to form the bottom wall of the hopper, and a cylindrical sheet metal sidewall 50 surrounding the disk and projecting upwardly therefrom to hold a quantity of the product in the hopper. The lower edge portion of the sidewall is secured to the periphery of the disk 49 and is spaced slightly above the upper surface of the wheel as shown in FIGS. 6 and 7. The annular brush 48 is secured to the outer side of the hopper by means of a ring 51 of downwardly opening channel-shaped cross-section holding the bristles, and a plurality of clips 52 holding the ring on the sidewall. The bristles extend downwardly beyond the lower sidewall edge, constituting an extension of the sidewall, and preferably are pressed lightly against the top surface 37.

A false bottom 53 of outwardly and downwardly inclined generally conical configuration is provided in the hopper 45 to direct the material therein outwardly toward the sidewall 50. The outer edge 54 of the false bottom is spaced inwardly from the sidewall to expose an annular portion of the disk 49 along the inside of the sidewall between the latter and the edge of the false bottom. This annular area is the dispensing area of the hopper.

As shown most clearly in FIG. 1, the material from the hopper 45 is fed into the tubes 18 through a plurality of dispensing openings 55 equally spaced along the dispensing area and herein formed by notches in the peripheral edge of the disk 49 closed on the open sides of the notches by the cylindrical sidewall 50 and the brush 48, the inner end portions of the notches being curved and slightly larger than the tops of the tubes. The pitch or spacing of the notches is the same as the pitch of the tubes, while the diameter of the pitch circle 57 along which these openings are spaced is substantially smaller than the pitch diameter 21 of the tubes. The vertical axis 58 of rotation of the hopper is offset from the wheel axis 20 toward the filling station 47 so that the openings 55 cross over the path of the tubes at the filling station and are offset inwardly from the tubes as the latter pass over the edge 44 of the closure plate 38. As indicated in FIG. 3, the material to be packaged is fed into the hopper through a spout 59 disposed above the hopper at any convenient location and preferably delivering a continuous flow of material to the hopper.

In the illustrative embodiment, the spacing of the axes 20 and 58 is such that the pitch circle 57 of the openings 55 touches and coincides with the pitch circle 21 of the tubes 18 at the filling station 47. Thus, the entire path of the openings 55 is disposed above the wheel 19 so that the wheel closes the openings at all times when the openings are not in communication with the tubes. A narrow rim 60 (FIG. 3) is formed around each notch 55 to ride on the wheel disk and space the underside 61 of the disk 49 above the wheel.

To support the hopper 45 for rotation above the wheel 19, the hopper disk 47 is mounted on a hub 62 (FIG. 3) fast on the lower end of a shaft 63 coaxial with the disk and extending upwardly through bearings 64 in a vertical sleeve 65 welded to the free end of an arm 67 adjustably clamped at its opposite end on the post 28. The shaft is rotated in the same direction as the wheel 19 by means of an endless chain 68 trained around a sprocket wheel 69 on the upper end of the supporting shaft and another sprocket wheel 70 on the continuously rotating drive shaft 34. By careful correlation of the drive ratios for the wheel and the hopper, the latter is rotated at a rate which moves the openings 55 through the filling station 47 at the velocity of the tubes 18 and brings each tube momentarily into register with an opening 55 as shown at the top of FIG. 1. Material begins to flow into the alined tube as soon as the area of communication is large enough to pass particles into the top of the tube, and continues to flow until the tube is full.

Beyond the filling station, the path of the tubes gradually departs from the path of the openings, moving generally in the same direction but sliding gradually outwardly as shown in the left-hand portion FIG. 1. It will be seen that there is little relative motion between the disks 19 and 49 and thus there will be verly little wearing away of the surfaces of particles disposed in the openings and sliding on the upper surface of the wheel disk.

During the departure of a tube 18 from its associated opening 55, the open end of the tube and the material therein move beneath the sidewall 50 of the hopper 45 and past the brush 48 at a very gradual rate as compared with the actual velocity of the tubes. Thus, the lower ends of the bristles sweep slowly across the tops of the tubes to smooth the material therein without danger of snapping particles of the material out of the tubes or dragging particles from the tubes.

Accordingly, the eccentrically mounted rotary hopper 45 rapidly measures and dispenses the product while at the same time, gradually smoothing the top surfaces of the material for a gentle leveling of the material that contributes materially to the accuracy of the measurement, particularly when the product is composed of relatively large particles that are more likely to flip out of the receptacle if the top surface is leveled with a rapid brushing action. Moreover, the sections of the disk 49 between the openings 55 hold the product away from the wheel 19, except at the openings, and the rotation of the receptacles and the openings at the same velocities results in very little relative motion at the openings and thereby minimizes grinding wear on the particles in contact with the upper surface 37 of the wheel.

I claim as my invention:

1. In a device for measuring and dispensing quantities of fluent material, the combination of, a frame, a wheel having a horizontal upper surface, means supporting said wheel on said frame for rotation about a vertical axis, a plurality of equally spaced measuring receptacles on said wheel equally spaced along a first pitch circle concentric with said wheel, said receptacles having open upper ends opening through said upper surface and open lower ends disposed below said wheel, a hopper disposed above said wheel and having a bottom wall overlying said upper surface with an annular series of equally spaced dispensing openings formed in said bottom wall along a second pitch circle of smaller diameter than said first pitch circle, the pitch of said receptacles and said openings being the same, means supporting said hopper on said frame for rotation about a vertical axis with said second circle touching said first circle on one side of said device whereby the path of rotation of said openings overlies the path of said receptacles on said one side and is spaced from the receptacle path on the opposite side, mechanism for rotating said wheel and said hopper in the same direction and moving said openings and said receptacles at the same velocity along the respective paths to bring each receptacle into alinement with one of said openings on said one side, and then out of alinement as the receptacles move toward said opposite side, said hopper having an upright sidewall surrounding said bottom wall with a lower edge spaced above said upper wheel surface and a continuous annular brush projecting downwardly from said sidewall into sweeping engagement with said upper surface outside the dispensing openings to level the material in the receptacles as the path of the receptacles departs from the path of said openings, and means for closing the lower ends of said receptacles while the latter are in communication with said openings and opening said lower ends to dispense the material therein along said opposite side.

2. In a device for measuring and dispensing quantities of fluent material, the combination of, a wheel mounted for rotation about a predetermined axis, a plurality of angularly spaced measuring receptacles on said wheel having open upper ends, said receptacles being disposed along a first pitch circle of predetermined diameter for movement along a circular path as said wheel rotates, a hopper for holding a quantity of said material mounted for rotation on top of said wheel about an axis parallel to the wheel axis and having a bottom wall with an annular series of dispensing openings spaced along a second pitch circle of smaller diameter than said first circle, said hopper axis being offset from said wheel axis with said pitch circles touching on one side of said device whereby the path of said openings overlies said receptacles on said one side and is spaced from the path of the receptacles on the opposite side of the device, mechanism for rotating said wheel and said hopper in the same direction to move said receptacles and said openings at the same velocity along the respective paths and bring each receptacle into communication with one of said openings on said one side thereby to fill each receptacle with material from said hopper, said hopper having a continuous annular brush extending around the outside of the series of dispensing openings and projecting downwardly for sweeping engagement with the material in the receptacles as the receptacle path departs from the path of said openings between said one side and said opposite side, and means for opening the lower end of each of said receptacles along said opposite side to dispense the material in the receptacle.

3. In a device for measuring and dispensing quantities of fluent material, the combination of, a wheel mounted for rotation about a predetermined axis, a plurality of angularly spaced measuring receptacles on said wheel having open upper ends, said receptacles being disposed along a first pitch circle of a predetermined diameter for movement along a circular path as said wheel rotates, a hopper for holding a quantity of said material mounted for rotation on top of said wheel about an axis parallel to the wheel axis and having an annular dispensing area lying along a second pitch circle of smaller diameter than said first circle, said hopper axis being offset from said wheel axis with said circles touching on one side of said device whereby said dispensing area overlies said receptacles on said one side and is spaced from the path of the receptacles on the opposite side, mechanism for rotating said wheel and said hopper in the same direction to move said receptacles and said dispensing area in the same direction, said hopper having a circular brush extending around the outside of said dispensing area and projecting downwardly into sweeping proximity to the top of said wheel to level the surface of the material in the receptacles as the receptacle path departs from the dispensing area, and means for opening the lower end of each of said receptacles along said opposite side whereby each receptacle first is filled with a quantity of material and then is emptied.

4. In a device for measuring and dispensing quantities of fluent material, the combination of, a carrier mounted for rotation about a predetermined axis, a plurality of angularly spaced measuring receptacles on said carrier having open upper ends, said receptacles being disposed along a first pitch circle of predetermined diameter for movement along a circular path said carrier rotates, a filler mounted for rotation on top of said carrier about an axis parallel to the carrier axis and having an annular dispensing area lying along a second pitch circle of smaller diameter than said first pitch circle, said filler axis being offset from said carrier axis with said circles touching on one side of said device whereby said dispensing area overlies said receptacles on said one side and is spaced from the path of the receptacles on the opposite side, mechanism for rotating said carrier and said filler in the same direction to move said receptacles and said dispensing area in the same direction, and means for opening the lower end of each of said receptacles along said opposite side whereby each receptacle first is filled with a measured quantity of material and then is emptied.

5. In a device for measuring and dispensing quantities of fluent material, the combination of, a carrier mounted for rotation about a predetermined axis, a plurality of angularly spaced measuring receptacles on said carrier having open upper ends, said receptacles being disposed along a first pitch circle of predetermined diameter for movement along a circular path as said carrier rotates, a filler mounted for rotation on top of said carrier about an axis parallel to the carrier axis and having an annular dispensing area lying along a second pitch circle of smaller diameter than said first pitch circle, said filler axis being offset from said carrier axis toward one side of said device with said dispensing area passing over the path of said receptacles on said one side to fill the latter with material and spaced from the receptacle path on the opposite side, mechanism for rotating said carrier and said filler in the same direction to move said receptacles and said dispensing area in the same direction, and means for opening the lower end of each of said receptacles along said opposite side whereby each receptacle is emptied.

References Cited by the Examiner

UNITED STATES PATENTS

| | | | |
|---|---|---|---|
| 2,616,606 | 11/1952 | Beehler | 222—302 X |
| 3,042,260 | 7/1962 | Thurlings | 222—352 |
| 3,168,121 | 2/1965 | Barthelmy | 222—370 X |

RAPHAEL M. LUPO, *Primary Examiner.*

H. S. LANE, *Assistant Examiner.*